Nov. 22, 1927.

E. DAVÉNES

DRYING APPARATUS

Filed Dec. 27, 1926

1,650,330

INVENTOR.
Emile Davénes
BY
ATTORNEY

Patented Nov. 22, 1927.

1,650,330

UNITED STATES PATENT OFFICE.

EMILE DAVÉNES, OF SIERRA MADRE, CALIFORNIA.

DRYING APPARATUS.

Application filed December 27, 1926. Serial No. 157,046.

My invention relates primarily to a drying apparatus for preparing leafy vegetables for salads and the object thereof is to provide a simple and efficient machine for that purpose and which can be used for drying other material.

Figure 1:
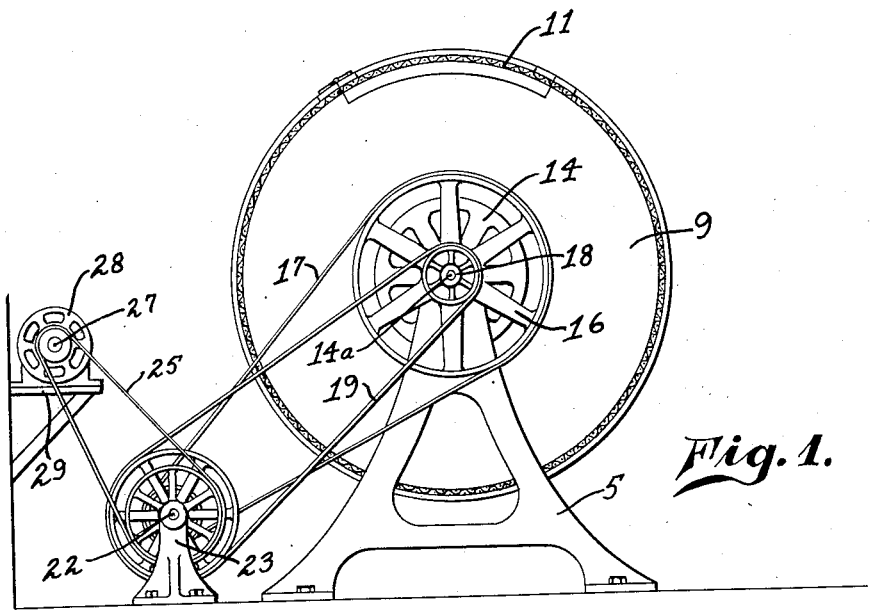
Figure 2:
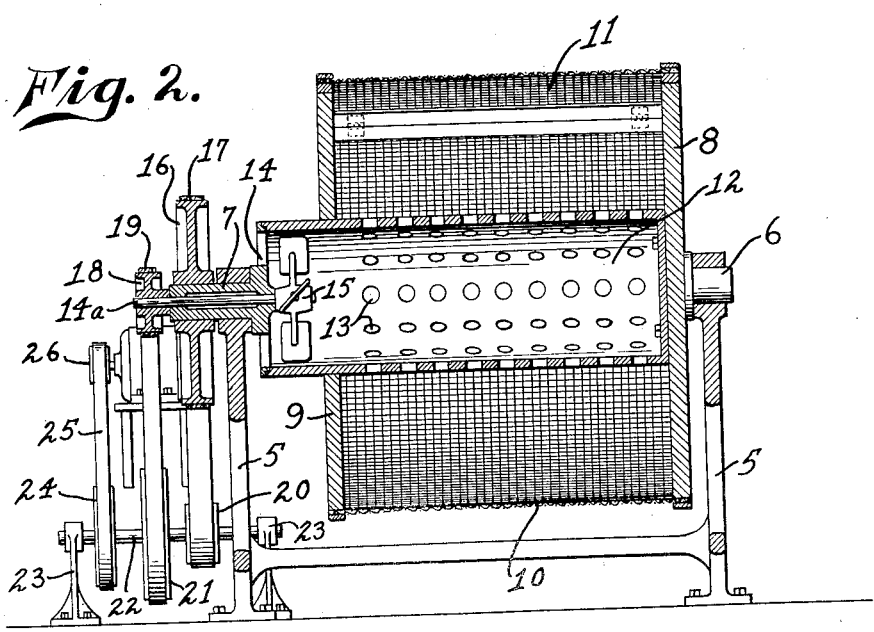

In the drawings forming a part of this application, Fig. 1 is an end elevation of my improved drying apparatus showing it driven by an electric motor. Fig. 2 is a side elevation of Fig. 1 with parts in section.

Referring to the drawings, a drying cylinder is revolubly mounted in frame 5 by means of trunnions 6 and 7. The drying cylinder is composed of an imperforate circular end wall 8 to which trunnion 6 is attached, a perforated circular end wall 9, an outer wire casing 10 which has a door 11, an inner air cylinder 12 having perforations 13, one end of which is attached to wall 8 and the other end of which projects through wall 9.

In the outer end of cylinder 12 is secured a spider 14 having a hub which forms trunnion 7. Through hub 7 projects shaft 14ᵃ on the inner end of which and within the outer end of cylinder 12 is mounted a fan 15. On hub 7 is mounted a pulley 16 which is driven by belt 17 to rotate the drying cylinder. A small pulley 18 is mounted on the outer end of shaft 14 and is driven by belt 19 to operate fan 15. Belts 17 and 19 pass around pulleys 20 and 21 respectively which are mounted on counter shaft 22 that is revolubly mounted in bearings 23. A pulley 24 is also mounted on shaft 22 and is driven by belt 25 that passes around pulley 26, which last pulley is mounted on the driving shaft 27 of the motor 28, mounted on frame 29.

Operation.

Assuming that the operator desires to make lettuce salad. He will first thoroughly wash the lettuce and place the same within the drying cylinder around the air cylinder and then start his motor which will cause the cylinders to revolve rapidly, thereby through centrifugal force the moisture on the lettuce will be thrown off the same and out of casing 10. At the same time fan 15 will be caused to revolve more rapidly and will force air into cylinder 12 out through perforations 13 and out through the lettuce, thereby thoroughly drying the lettuce in much less time than it can be dried in any other manner with which I am acquainted.

Other means of driving the cylinders and fan can be used but I prefer an electric motor to drive them. An imperforate casing, not shown could enclose casing 10 to prevent the water thrown off in the drying operation from being objectionable. Cylinder 12 could be wholly within casing 10. My apparatus can be used for drying other things.

Having described my invention I claim:

1. In an apparatus of the character described a frame; a drying cylinder composed of a casing having end walls to the outer edge of which is secured a wire casing having a door therein; a perforated air cylinder within said wire casing and secured by one end to one end wall and projecting through the other end wall; a pierced spider having a hub secured to said air cylinder, said hub forming a trunnion; a second trunnion secured to the end wall of the drying cylinder opposite said hub, said trunnions being mounted in said frame; a shaft projecting through said hub; a fan mounted on said shaft within said air cylinder; and means to revolve said cylinders and fan.

2. A device of the character described comprising an outer perforated cylindrical casing; an imperforate end for said casing; a trunnion centrally secured to said end; an end having a central perforation secured to the other end of said casing; a hollow trunnion centrally secured to said last end; a door in said casing; an inner perforated cylindrical casing centrally secured to the ends of said first casing; a fan revolubly mounted within said central casing; means to revolubly mount said trunnions; and means to revolve said fan and said casings.

In witness that I claim the foregoing I have hereunto subscribed my name this 15th day of December, 1926.

EMILE DAVÉNES.